United States Patent
Iimura et al.

(10) Patent No.: US 10,061,324 B2
(45) Date of Patent: Aug. 28, 2018

(54) AUTONOMOUS MOVING DEVICE AND SELF POSITION ESTIMATION METHOD

(71) Applicant: HITACHI, LTD., Chiyoda-ku, Tokyo (JP)

(72) Inventors: Taiki Iimura, Tokyo (JP); Kenjiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/326,294

(22) PCT Filed: Jul. 30, 2014

(86) PCT No.: PCT/JP2014/069989
§ 371 (c)(1),
(2) Date: Jan. 13, 2017

(87) PCT Pub. No.: WO2016/016955
PCT Pub. Date: Feb. 4, 2016

(65) Prior Publication Data
US 2017/0205832 A1 Jul. 20, 2017

(51) Int. Cl.
*G05D 1/02* (2006.01)
*G01B 11/00* (2006.01)
*G06T 7/73* (2017.01)
*H04N 5/232* (2006.01)
*H04N 7/18* (2006.01)
*G01C 21/16* (2006.01)

(52) U.S. Cl.
CPC .......... *G05D 1/0246* (2013.01); *G01B 11/00* (2013.01); *G01C 21/165* (2013.01); *G05D 1/0253* (2013.01); *G05D 1/0272* (2013.01); *G06T 7/73* (2017.01); *G06T 7/74* (2017.01); *H04N 5/23296* (2013.01); *H04N 7/185* (2013.01); *G06T 2207/10016* (2013.01); *G06T 2207/30204* (2013.01); *G06T 2207/30244* (2013.01); *G06T 2207/30252* (2013.01)

(58) Field of Classification Search
CPC .... G06Q 10/02; G05D 1/0217; G05D 1/0022; G05D 1/0214; G01C 21/3469
USPC ...................................................... 701/26, 28
See application file for complete search history.

(56) References Cited

U.S. PATENT DOCUMENTS

2010/0023195 A1* 1/2010 Traster ................. G01S 15/025
701/23
2014/0297093 A1* 10/2014 Murai .................... G01C 21/20
701/27

FOREIGN PATENT DOCUMENTS

| JP | 2005-315746 | * 11/2005 |
| JP | 2005-315746 A | 11/2005 |
| JP | 2005315746 | * 11/2005 |

* cited by examiner

*Primary Examiner* — Muhammad Shafi
(74) *Attorney, Agent, or Firm* — Miles & Stockbridge P.C.

(57) ABSTRACT

An object of the present invention is to provide an autonomous moving device or the like that estimates a self position based on an arrangement of landmarks in surrounding environment while suppressing the influence by external disturbances. In order to achieve the object described above, an external disturbance factor which becomes an external disturbance and a landmark used for the self position estimation when estimating a self position from an image captured by a wide angle camera are extracted, the landmark which is not affected by the external disturbance factor is selected from an image captured by the standard camera capable of controlling a posture using the extracted information, the posture of the standard camera is controlled so as to track the selected landmark, and the self position is estimated based on the arrangement of the landmarks captured by the tracking-controlled standard camera.

6 Claims, 3 Drawing Sheets

[Fig. 1]
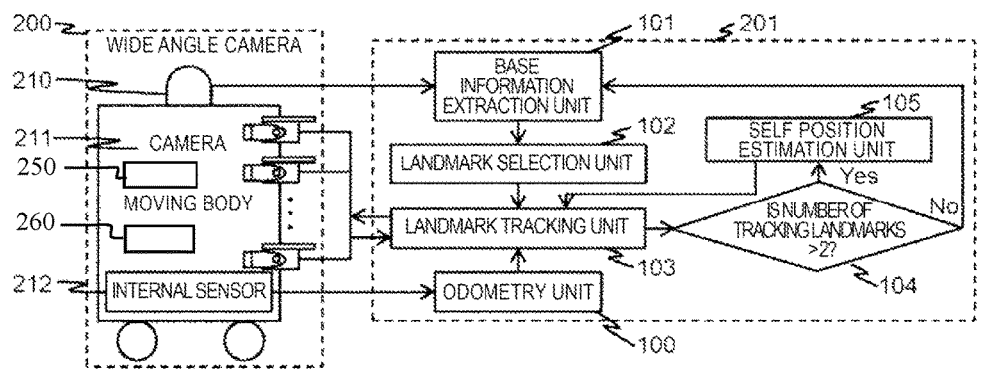
[Fig. 2]
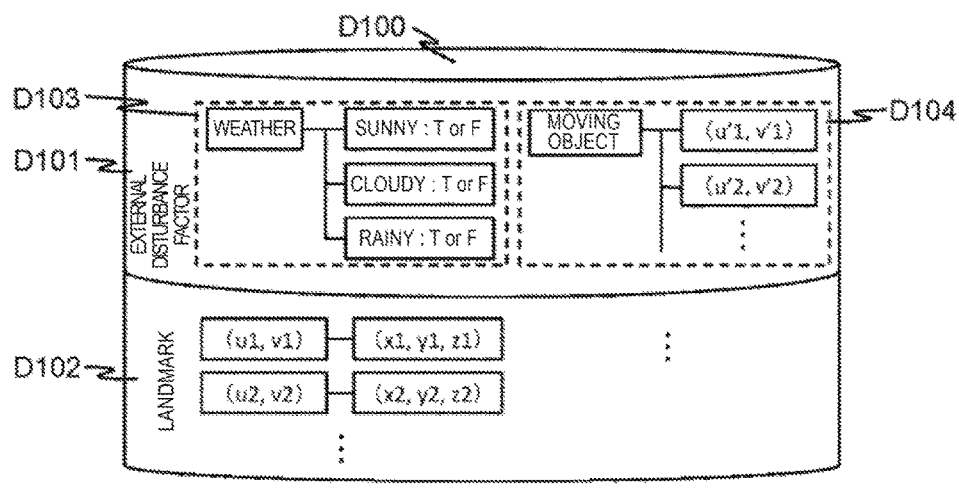

[Fig. 3]
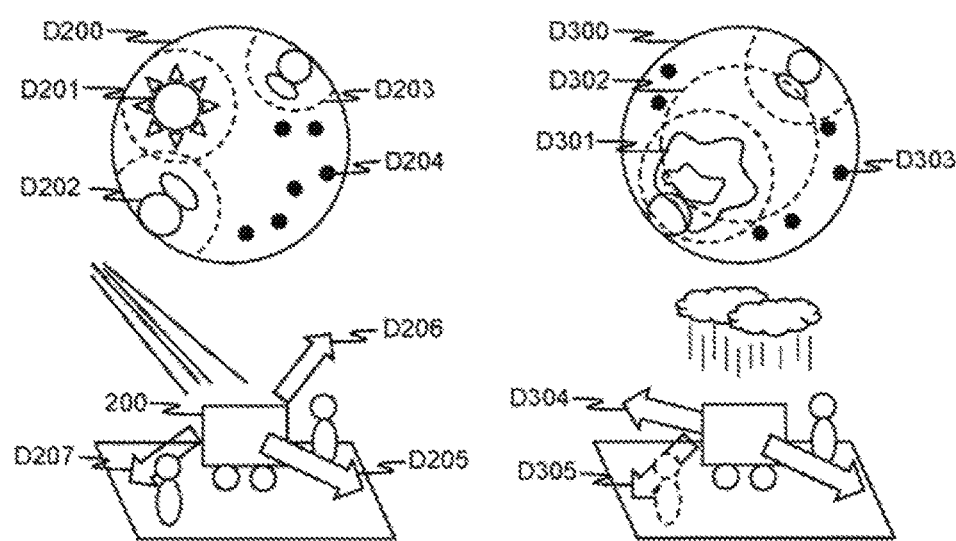

[Fig. 4]
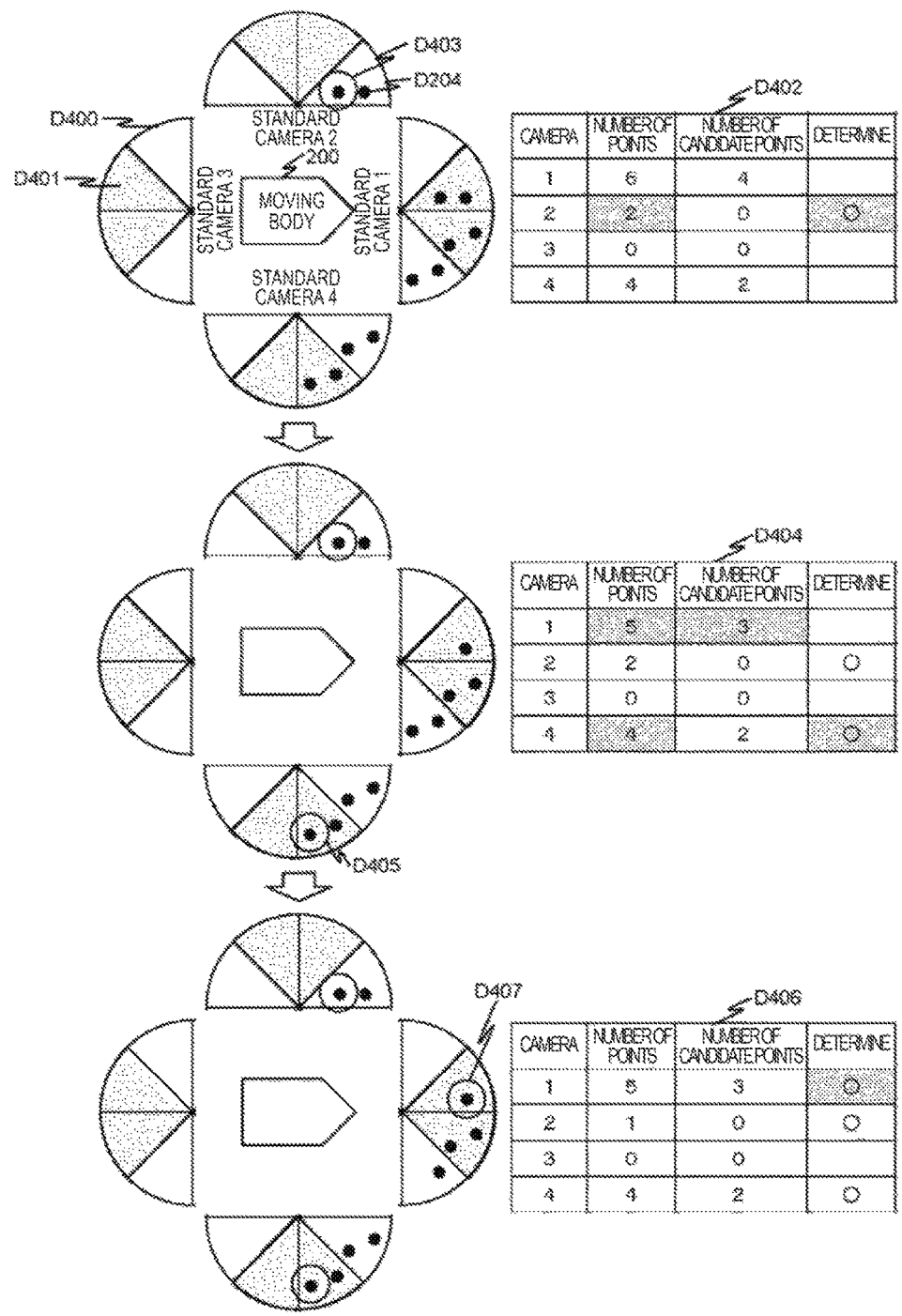

AUTONOMOUS MOVING DEVICE AND SELF POSITION ESTIMATION METHOD

TECHNICAL FIELD

The present invention relates to an autonomous moving device and a self position estimation method, and for example, to a device that estimates a self position when a moving body such as a robot or a vehicle autonomously moves.

BACKGROUND ART

In the related art, various devices are proposed, which estimate a self position of a moving body based on sensor values from internal sensors such as an encoder or a gyroscope and a camera mounted on the moving body such as a robot or a vehicle.

For example, in Patent Literature 1 (JP-A-2005-315746) described below, a self position identification method of an autonomously travelling moving body under an environment in which multiple landmarks are arranged on the upper part of a room is characterized by including: a step of measuring the multiple landmark positions in advance and pre-registering the coordinates on an absolute coordinate system with a reference; a step of extracting a landmark candidate point from an image captured upward direction by a wide angle camera mounted on the moving body and calculating a two-dimensional candidate point coordinate corresponding to the extracted candidate point, a step of setting multiple arbitrary virtual points in a travelling region of the moving body on the absolute coordinate system and respectively deriving the two-dimensional coordinates of the landmarks on the image that can be obtained in a case where the moving body is present on the virtual point using the three-dimensional registration position coordinates, and a step of respectively comparing the coordinates of the candidate point and the two-dimensional coordinates and estimating the virtual point of the moving body corresponding to the two-dimensional coordinates most approximate to the candidate point coordinates as the self position of the moving body.

According to the Literature, the multiple virtual points are set, and then, the self position is estimated from the two-dimensional coordinates of the landmark in the virtual points and the candidate point coordinates of the landmark extracted from the image captured by the wide angle camera. Therefore, without a need for identification of the individual landmark, and further, even in a case where only a part of the landmark can be extracted from the image captured by the wide angle camera due to an unclear viewing range, it is possible to stably and accurately estimate the self position of the moving body. Furthermore, self position identification robust to the environment disturbance such as a change of lighting can be achieved, and in addition, the self position identification strong to the external disturbance due to a shielding obstacle or the like can be performed because the upward image such as a ceiling is used. Moreover, since the wide angle camera such as a camera using a fish-eye lens or an omnidirectional camera is used, a field of view becomes wide, and thus, the self position identification can be performed without needing the multiple landmarks.

CITATION LIST

Patent Literature

PTL 1: JP-A-2005-315746

SUMMARY OF INVENTION

Technical Problem

The self position estimation method in the related art is a method in which a landmark candidate in the surrounding environment is detected from an image, the detected landmark candidate is caused to correspond to a landmark in a map, and the self position is estimated based on the arrangement of the landmarks. However, the landmark may be lost-sight or may be erroneously recognized due to various external disturbance factors existing in the surrounding environment. Therefore, there is a problem in that the self position is lost or an accuracy of the self position deteriorates. Here, in the self position identification method and the related device in Patent Literature 1, the landmark candidate is detected from a wide range on the ceiling using the wide angle camera, and multiple virtual points are set, and then, the self position is estimated from the two-dimensional coordinates of the landmark on the virtual point and the landmark candidate point coordinates. Therefore, it is possible estimate a self position robust to the shielding obstacle or the change of the lighting. However, the travelable environment is limited such that the landmark is arranged on the top, on the ceiling in the room and on approximately the same plane. In addition, in the actual environment in which not only the shielding obstacle or the change of the lighting but also various external disturbances exist, the self position is not robust to the external disturbances.

An object of the present invention is to provide an autonomous moving device or the like that estimates the self position based on the arrangement of the landmarks in the surrounding environment while suppressing the influence by the external disturbances.

Solution to Problem

In order to solve the problems described above, a representative autonomous moving device in the present invention is an autonomous moving body including a wide angle camera, a standard camera capable of controlling a posture, and an internal sensor. The device includes: a odometry unit that performs an odometry of the autonomous moving body using the internal sensor; a database in which a feature of an image of an external disturbance factor which becomes an external disturbance when estimating a self position of the autonomous moving body is stored; a base information extraction unit that extracts the external disturbance factor and a landmark used for the self position estimation from an image captured by the wide angle camera with reference to the database; a landmark selection unit that selects the landmark which is not affected by the external disturbance factor from an image captured by the standard camera using the information extracted by the base information extraction unit; a landmark tracking unit that controls a posture of the standard camera so as to track the landmark selected by the landmark selection unit based on a result of odometry calculated by the odometry unit; and a self position estimation unit that estimates the self position based on an arrangement of the landmarks captured by the standard camera tracking-controlled by the landmark tracking unit.

Advantageous Effects of Invention

According to the present invention, it is possible to provide an autonomous moving device or the like that estimates the self position based on the arrangement of the landmarks in the surrounding environment while suppressing the influences by the external disturbances.

BRIEF DESCRIPTION OF DRAWINGS

FIG. 1 is a block diagram illustrating a configuration of a moving body in an embodiment 1.

FIG. 2 is a diagram illustrating an example of base information in the embodiment 1.

FIG. 3 is a diagram illustrating an example of a landmark selection unit in the embodiment 1.

FIG. 4 is a diagram illustrating an example of the landmark selection unit in the embodiment 1.

DESCRIPTION OF EMBODIMENTS

Hereinafter, an embodiment will be described using the drawings.

Embodiment 1

In the present embodiment, when a moving body such as a vehicle or a robot is autonomously moving, the moving body can perform an autonomous moving robust to an external disturbance by mounting a wide angle camera capable of capturing images of a wide range on the upper portion of the moving body toward the upward direction, mounting multiple standard cameras which are capable of controlling a posture, detecting an external disturbance factor and a landmark by the wide angle camera using the autonomous moving device in the present invention, and tracking the landmark difficult to be lost in the camera according to the external disturbance factor using the posture control of the camera.

FIG. 1 illustrates a configuration of a moving body 200 in the present embodiment. The moving body 200 mounts a wide angle camera 210, a standard camera 211, and an internal sensor 212, and includes a calculation processing unit 250 configured to include a CPU (not illustrated) or the like and a storage unit 260 that stores various programs.

In addition, various functions which are programs stored in the storage unit 260 and executed by the calculation processing unit 250 are illustrated in FIG. 1 as an autonomous moving function block 201. The program executed by the calculation processing unit 250 is configured to include an odometry unit 100, a base information extraction unit 101, a landmark selection unit 102, a landmark tracking unit 103, and a self position estimation unit 105.

It is desirable that the wide angle camera 210 is a fish-eye camera or an omnidirectional camera on which a super-wide-angle lens is mounted. However, a camera on which a wide-angle lens other than those is mounted may be useful. In addition, in order to use the camera in the indoor with less lighting or the outdoor at night, it is desirable to use an infrared camera. The wide angle camera 210 is mounted on the upper portion of the moving body 200 toward the upward direction.

The standard camera 211 is a high-resolution camera on which a standard lens is mounted, and the posture of the standard camera 211 can be controlled by an input from outside. The standard camera 211 communicates with the landmark tracking unit 103. It is desirable that equal to or more than four standard cameras 211 are mounted, and the four cameras are mounted on a front portion and rear portion, and a right side surface and a left side surface of the moving body 200. A height of mounting the standard cameras 211 is a height such that the standard camera 211 is not reflected in the image captured by the wide angle camera 210 when the standard cameras 211 is in the posture in which the line-of-sight direction is maximally directed toward the elevation direction. Furthermore, in order to use the camera in the rain, it is desirable to use, for example, a camera with eaves such as a search camera. In order to use the camera in the indoor with less lighting or the outdoor at night, it is desirable to use a camera mounting a search light, or an infrared camera may be used.

The internal sensor 212 is a sensor for calculating a relative amount of movement of the moving body 200. A wheel encoder, a gyroscope and an inertial measurement unit (IMU) are included as examples of the internal sensor 212.

An odometry is applied to the odometry unit 100, which is a method of calculating the amount of movement and a change posture from the time of previous position calculation by accumulating a wheel rotation speed, movement acceleration, and a movement angular acceleration of the moving body 200 acquired from the internal sensor 212.

The base information extraction unit 101 extracts base information including information on the external disturbance factor which causes a lose-sight of the landmark and landmark information on the surrounding environment from the image captured by the wide angle camera 210. The details of the base information extraction unit 101 will be described using FIG. 2.

The landmark selection unit 102 searches for a visible area which can surely be seen regardless of the external disturbance among the surrounding environment based on the base information extracted by the base information extraction unit 101, and selects a tracking landmark used for self position estimation from the visible area. The details of the landmark selection unit will be described using FIGS. 3 and 4.

The landmark tracking unit tracks the tracking landmark selected by the landmark selection unit while controlling the posture of the standard camera 211.

At a condition branch 104, the process moves to the base information extraction unit 101 in a case where the number of tracking landmarks which can be tracked by the landmark tracking unit is equal to or less than two, and moves to the self position estimation unit 105 in a case where the number of tracking landmarks is equal to or greater than three.

In a case where the number of tracking landmarks which can be tracked by the landmark tracking unit is equal to or greater than three, the self position estimation unit 105 performs the self position estimation based on the arrangement of the tracking landmark which can be tracked. As a method of performing the self position estimation based on the arrangement of the landmark, it is desirable to use a map in which the information on the arrangement of each landmark is indicated. For example, a simultaneous localization and mapping (SLAM) which is a method based on the Bayes' Theorem or a method in which a Kalman filter, and a map creation, update and self position estimation are performed at the same time can be exemplified. However, another method may used as long as the self position is estimated based on the arrangement of the landmark. In addition, the self position estimation unit 105 performs the self position estimation based on the same arrangement of the tracking landmark until the standard camera loses sight of the landmark in the landmark tracking unit 103. As a result, there is an effect that the calculation processing load can be reduced. FIG. 2 illustrates the details of the base information extraction unit 101.

D100 is the base information extracted by the base information extraction unit 101, and is configured to include the information on an external disturbance D101 and a landmark D102.

The external disturbance D101 includes, for example, a weather D103 and a moving object D104 existing in the surrounding environment.

As a method of extracting the weather D103, for example, when a rain drop is attached on the lens, assuming that an image of the rain drop attached portion is teacher data, and collating the image captured by the wide angle camera 210 and the teacher data, in a case where there are many pixels that match with the teacher data, the weather is assumed to be rainy, and in a case where there are few pixels that match with the teacher data, the weather is assumed to be sunny or cloudy. Furthermore, if a sample average of the brightness value of all the pixels in the captured image is equal to or greater than a constant value, then, the weather is assumed to be sunny, and otherwise, assumed to be cloudy. In a case of sunny, the direction of the sunlight is calculated based on a magnitude of the brightness gradient. A result of recognizing the weather is indicated as, for example, True (T) if the weather is sunny, False (F) if cloudy, and False if rainy.

As a method of extracting the moving object D104, for example, a human detection method is used, in which human teacher data that is a main external disturbance is prepared in advance, and then, the image captured by the wide angle camera 210 and the teacher data are collated. In a case where there exists another moving object which becomes the main external disturbance in the targeted travel environment, the teacher data may be prepared and the same method may be used in the detection. Furthermore, a center of gravity position (u'i, v'i) (i=1, 2, . . . ) of the detected moving object on the captured image is calculated, and the position is added to the base information D100 as the information on the moving object D104.

The information on the landmark D102 in the base information extraction unit 101 is acquired by detecting a feature point from the image captured by the wide angle camera 210 and calculating the position (ui, vi) (i=1, 2, . . . ) of the detected feature point on the captured image, the position is added to the base information D100 as the information on the landmark D102.

FIG. 3 illustrates the details of a landmark recognition operation in the landmark selection unit 102.

D200 is an image captured by the wide angle camera 210 when the weather is sunny. In the image D200, a lens flare D201 due to the sunlight and a moving object D202 are reflected. At this time, first, the landmark selection unit checks the weather D103 and the moving object D104 from the captured image D200 based on the base information D100 extracted by the base information extraction unit 101, and detects the center of gravity position of the lens flare D201 and the center of gravity position of the moving object D202 on the captured image.

Furthermore, a circular area D203 having a center at the center of gravity position is provided, and a landmark D204 is extracted as a feature point on the image that is on the outside of the circular area. Then, the landmark D204 as the extracted feature point on the image and the map on which the landmark is indicated are collated, and then, the three-dimensional coordinates of the landmark D204 as the extracted feature point on the image can be checked. That is, the landmark D204 is recognized.

The operation for recognizing the landmark D204 is an operation to find a direction D205 not affected by the moving body and an upward direction D206 and a downward direction D207 not affected by the sunlight when the moving body 200 is travelling outside and the weather is sunny.

D300 is an image captured by the wide angle camera 210 when the weather is rainy. In the image D300, raindrops D301 and the moving body D202 are reflected. At this time also, the landmark selection unit 102 performs the operation the same as the landmark recognition operation in the sunny weather. However, a circular area having a center at the center of gravity position of the rain drop D301 and a circular area D302 having a center at the center of the image are provided such that each standard camera does not look at the sky to prevent the rain drops from being attached to the lens, and then, a landmark D303 is extracted as the feature point on the image on the outside of the circular area. The subsequent operation is the same as that in the sunny weather, however, a horizontal direction D304 and a downward direction D305 in which the rain drops are not attached are found by performing the above described operation in the rainy weather.

In a case where the weather is cloudy, it is not necessary to provide the circular area D201 of the lens flare, the circular area of the rain drop D301, and the circular area D302 of the sky, and the subsequent operation is the same as that in the sunny and rainy weather.

FIG. 4 illustrates the details of a tracking landmark determination operation by the landmark selection unit 102 in a case where each of the standard cameras 211 is mounted on the front, rear, left, and right side of the moving body 200 respectively.

D400 is a bisection of the captured image D200 and the landmark D204 in FIG. 3 in the front and rear or in the left and right directions. The standard cameras that can tracks the landmark reflected on the bisected image without any geometric constraints are allocated in each of the images. That is, a standard camera 1 can track the landmark in the front direction, a standard camera 2 can track the landmark in the left side, a standard camera 3 can track the landmark in the rear direction, and a standard camera 4 can track the landmark in the right side.

D401 illustrates two images in the middle of four images when the bisected image is further equally divided into four images, and the landmark reflected on the image D401 is recommended as the tracking landmark.

D402 is a table of the number of landmarks reflected on the bisected image D400 corresponding to each standard camera 211 and the number of landmarks recommended as the tracking landmark reflected on the middle images D401. Now, the numbers of landmarks reflected on the image 401 corresponding to each standard cameras 211 are six in the standard camera 1, two in the standard camera 2, zero in the standard camera 3, and four in the standard camera 4, and the number of landmarks in the standard camera 2 is the least except the standard camera 3 where there is no landmark. Therefore, the standard camera 2 initially determines the tracking landmark. As a method of determination, checking whether or not there are landmarks reflected on the middle images D401, and if there are the recommended landmarks, the landmark closest to the center of the image D401 (that is, a polarization angle is closest to) 90° among the landmarks is determined to be the tracking landmark, and if there are no recommended landmarks, the landmark closest to the center in the image D400 is determined to be the tracking landmark. In a case of this example, since there is no recommended landmark, a landmark D403 which is closest to the center of the image is determined to be the tracking landmark of the standard camera 2.

D404 is a table of the number of landmarks when the tracking landmark determination operation by the standard camera 2 ends. By the landmark D403 being determined to be the tracking landmark, the number of tracking landmark candidates of the standard camera 1 is reduced to five from six, and thus, the number of recommended landmarks is also reduced to three from four. In this state, the standard camera in which the number of landmarks is smallest is selected again from the standard cameras in which the tracking landmark is not determined, and the tracking landmark of the selected standard camera is determined using the method same to tracking landmark determination operation. In a case of this example, the standard camera 4 in which the number of landmarks is smallest is selected, and a landmark D405 which is closest to the center of the image is determined as the tracking landmark of the standard camera 4.

D406 is a table of the number of landmarks after the tracking landmark is determined. At this time, in this example, since the tracking landmark is not determined only in the standard camera 1 except the standard camera 3 in which the landmark is not reflected, a tracking landmark D407 of the standard camera 1 is determined using the same method.

In this example, the landmarks that are tracked by the standard camera 1, the standard camera 2, and the standard camera 3 is determined respectively by the tracking landmark determination operation described above. However, the landmark of the standard camera 3 is not determined. As described above, the standard camera in which the tracking landmark is not determined by the tracking landmark determination operation is caused to turn the direction of the line-of-sight toward the road surface and to fix the posture, and then, a visual odometry is applied to the standard camera. The result of the visual odometry is used by the landmark tracking unit 103 together with the result from the odometry unit 100.

Using the configuration described above, the autonomous moving device in the present invention can move without losing the sight of the self position in various environments by tracking the landmark that does not depend on the external disturbance using the posture control of the camera, differently from the autonomous moving device in the related art.

As described above, in the present embodiment, the moving body can move without losing the sight of the self position in various environments. In addition, since the number of tracking landmarks is limited, the processing load can be reduced.

In addition, since only one image captured by the wide angle camera capable of extracting the environment information on 360° in surroundings is used, it is possible to obtain an effect that the processing load for extracting the information on the surrounding environment can be reduced.

In addition, since the landmark can be found without losing the sight regardless of the weather or the moving object such as a person, it is possible to obtain an effect that the robustness of the self position estimation can be improved.

In addition, since the landmark is tracked by the high-precision camera, it is possible to obtain an effect that the accuracy of the self position estimation can be improved.

In addition, since the self position is estimated based on the same arrangement of the landmarks till the lose-sight, it is possible to obtain an effect that the calculation processing load can be reduced.

The present invention is not limited to the embodiment described above, and various modification examples can be included thereto. For example, the embodiment described above is described in detail in order to make it easy to understand, and it is not limited to the embodiment necessarily including all the described configurations. In addition, all or a part of the configurations, functions, processing units, and processing means described above may be realized by, for example, hardware designed as an integrated circuit. In addition, the configurations, functions and the like described above may be realized by software by interpreting and executing the program in which the processor realizes each of the functions. The information such as the program, tables, and files that realizes each of functions can be stored in a recording device such as a memory, a hard disk, a solid state drive (SSD), or in a recording medium such as an IC card, an SD card, or a DVD.

REFERENCE SIGNS LIST 200 moving body
210 wide angle camera
211 standard camera
212 internal sensor
201 autonomous moving function block
100 odometry unit
101 base information extraction unit
102 landmark selection unit
103 landmark tracking unit
105 self position estimation unit

The invention claimed is:

1. An autonomous moving device that is an autonomous moving vehicle including a wide angle camera, a standard camera having a posture capable of being controlled, and an internal sensor, the autonomous moving device comprising:
an odometry unit that performs odometry of the autonomous moving vehicle using the internal sensor;
a storage unit in which a feature of an image of an external disturbance factor which becomes an external disturbance when estimating a self position of the autonomous moving vehicle is stored;
a base information extraction unit that extracts said external disturbance factor and a plurality of landmarks used for the self position estimation from an image captured by the wide angle camera with reference to the storage unit;
a landmark selection unit that selects one of said plurality of landmarks which is not affected by the external disturbance factor from an image captured by the standard camera using the information extracted by the base information extraction unit;
a landmark tracking unit that controls a posture of the standard camera to aim said standard camera in a direction to track the landmark selected by the landmark selection unit based on a result of odometry calculated by the odometry unit, said direction being selected to avoid an influence of said external disturbance factor; and
a self position estimation unit that estimates the self position based on an arrangement of a plurality of non-planar landmarks captured by the standard camera which is tracking-controlled by the landmark tracking unit, wherein self position estimation unit is configured to suppress said influence of said external disturbance on said estimated self-position by using said extracted external disturbance factor, and Wherein said landmark tracking unit is configured to control a movement of said autonomous moving vehicle by maintaining an accuracy of said estimated self-position which is independent from said influence of said external disturbance factor on said estimated self-position.

2. The autonomous moving device according to claim 1,
wherein the storage unit stores the weather or an image feature of a moving object as the external disturbance factor, and
wherein the base information extraction unit eliminates a feature point which becomes the external disturbance factor from the image captured by the wide angle camera, and detects another feature point on the image which becomes a landmark candidate.

3. The autonomous moving device according to claim 1,
wherein a plurality of the standard cameras are included so as to capture images in different directions,
wherein the base information extraction unit extracts a plurality of the landmark candidates used for self position estimation, and
wherein, for each standard camera, the landmark selection unit selects a landmark suitable for being tracked by each standard camera from among the plurality of landmark candidates extracted by the base information extraction unit.

4. The autonomous moving device according to claim 3,
wherein the landmark tracking unit controls the posture of each said standard camera using a result of the odometry calculated by the odometry unit such that the landmark selected by the landmark selection unit is positioned at a center of the image captured by the standard camera.

5. The autonomous moving device according to claim 1,
wherein the self position estimation unit estimates the self position based on the arrangement of the landmarks tracked by the landmark tracking unit, and estimates the self position based on the same arrangement of the tracking landmarks until the standard camera loses sight of the landmark by the landmark tracking unit.

6. A self position estimation method for an autonomous moving vehicle including a wide angle camera, a standard camera, a calculation processing unit, and an internal sensor, the method comprising:
extracting, from a storage unit using the calculation processing unit, an external disturbance factor associated with an external disturbance, and a plurality of landmarks used for self position estimation when estimating a self position from an image captured by a wide angle camera;
selecting, by the calculation processing unit, one of said plurality of landmarks which is not affected by the external disturbance factor from an image captured by the standard camera;
controlling, by the calculation processing unit, a posture of the standard camera to aim said standard camera in a direction to track the selected landmark, said direction being selected to avoid an influence of said external disturbance factor; and
estimating, by the calculation processing unit, the self position based on an arrangement of a plurality of non-planar landmarks captured by the tracking-controlled standard camera, wherein said estimating further comprises suppressing said influence of said external disturbance on said estimated self-position by using said extracted external disturbance factor, and
controlling a movement of said autonomous moving vehicle by maintaining an accuracy of said estimated self-position which is independent from said influence of said external disturbance factor on said estimated self-position.

* * * * *